(12) United States Patent
Remsing et al.

(10) Patent No.: US 6,296,437 B1
(45) Date of Patent: Oct. 2, 2001

(54) DISCHARGE STACKING STATION FOR SORTATION CONVEYING SYSTEM

(75) Inventors: David A. Remsing, Sussex; Jason M. Knas; Todd R. Eggebrecht, both of Mukwonago, all of WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 09/439,862

(22) Filed: Nov. 12, 1999

(51) Int. Cl.⁷ .................................................... B65G 57/11
(52) U.S. Cl. .......................................... 414/801; 414/798.7
(58) Field of Search ..................................... 271/181, 215, 271/149; 414/790.3, 798.6, 798.7, 794.3

(56) References Cited

U.S. PATENT DOCUMENTS

| | | |
|---|---|---|
| 4,526,501 | 7/1985 | Blumle . |
| 4,834,606 | 5/1989 | Burns et al. ........................ 414/795.3 |
| 4,897,017 | 1/1990 | Castiglioni ......................... 414/790.8 |
| 5,112,042 | * 5/1992 | Tilles et al. ....................... 271/181 X |
| 5,707,204 | 1/1998 | Haase ..................................... 414/790 |
| 5,727,674 | 3/1998 | St. John et al. ...................... 198/809 |

FOREIGN PATENT DOCUMENTS

| | | | |
|---|---|---|---|
| 0 286 886 | * 10/1988 | (EP) ................................... 414/798.7 |
| 1 412 417 | * 8/1965 | (FR) ................................... 414/798.7 |
| 2 051 722 | * 1/1981 | (GB) ................................... 414/794.3 |

\* cited by examiner

*Primary Examiner*—Janice L. Krizek
(74) *Attorney, Agent, or Firm*—Andrus, Sceales, Starke & Sawall, LLP

(57) ABSTRACT

A discharge stacking station for a sortation conveying system uses a reciprocating stacking member to stack orders of articles onto an accumulation tray for the station in an aligned series. Articles are provided in singular fashion from a core conveyor for the sortation conveying system onto the reciprocating stacking member via an inclined chute. The reciprocating stacking member preferably has a floor and a backstop wall which are mounted for reciprocating sliding motion along a small portion of the accumulation tray for the stacking station at a loading end of the tray. A stationary stop member is disposed above the floor of the reciprocating stacking member. When a photoelectric eye senses the passing of an article onto the reciprocating stacking member, a computer controlled actuator pulls the reciprocating stacking member towards the stationary stop member to a retracted position. The stationary stop member pushes the article from the floor of the reciprocating stacking member, thereby causing the article to drop onto the accumulation tray. The actuator then returns the reciprocating stacking member to its original position ready for accepting the next article. When returning to the article receiving position, the reciprocating stacking member pushes the dropped article incrementally along the accumulation tray. This process is repeated for each respective article, thus creating a series of articles stacked on edge and side-by-side on the accumulation tray from which attending workers are able to efficiently and conveniently remove the articles and pack orders for distribution.

4 Claims, 3 Drawing Sheets

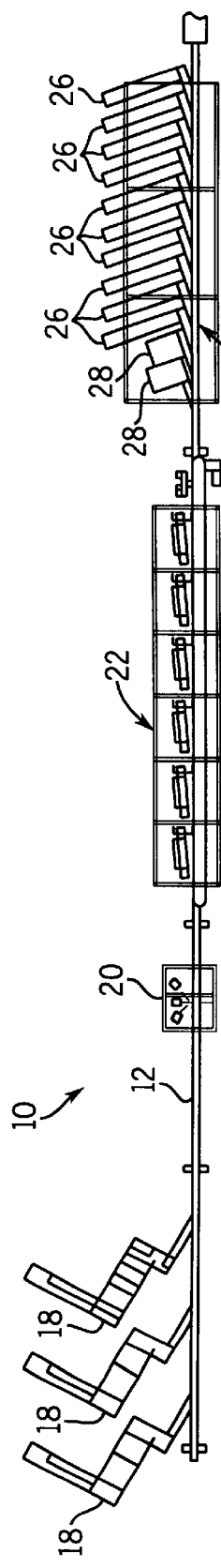
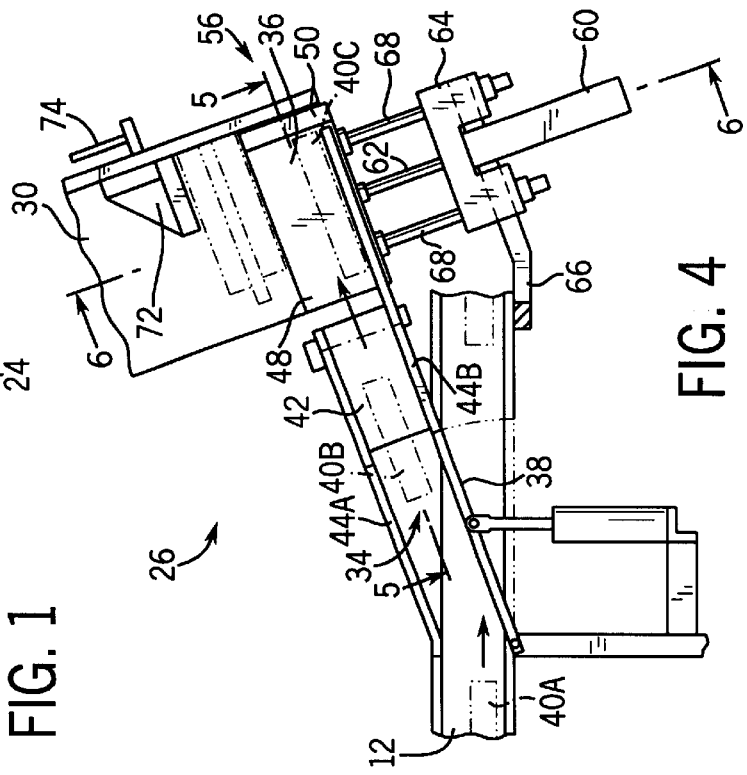
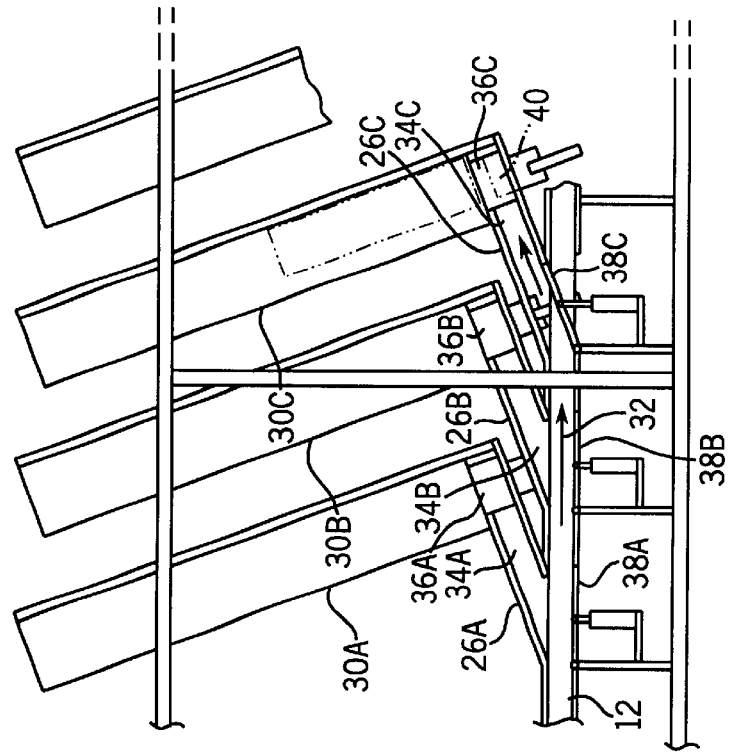

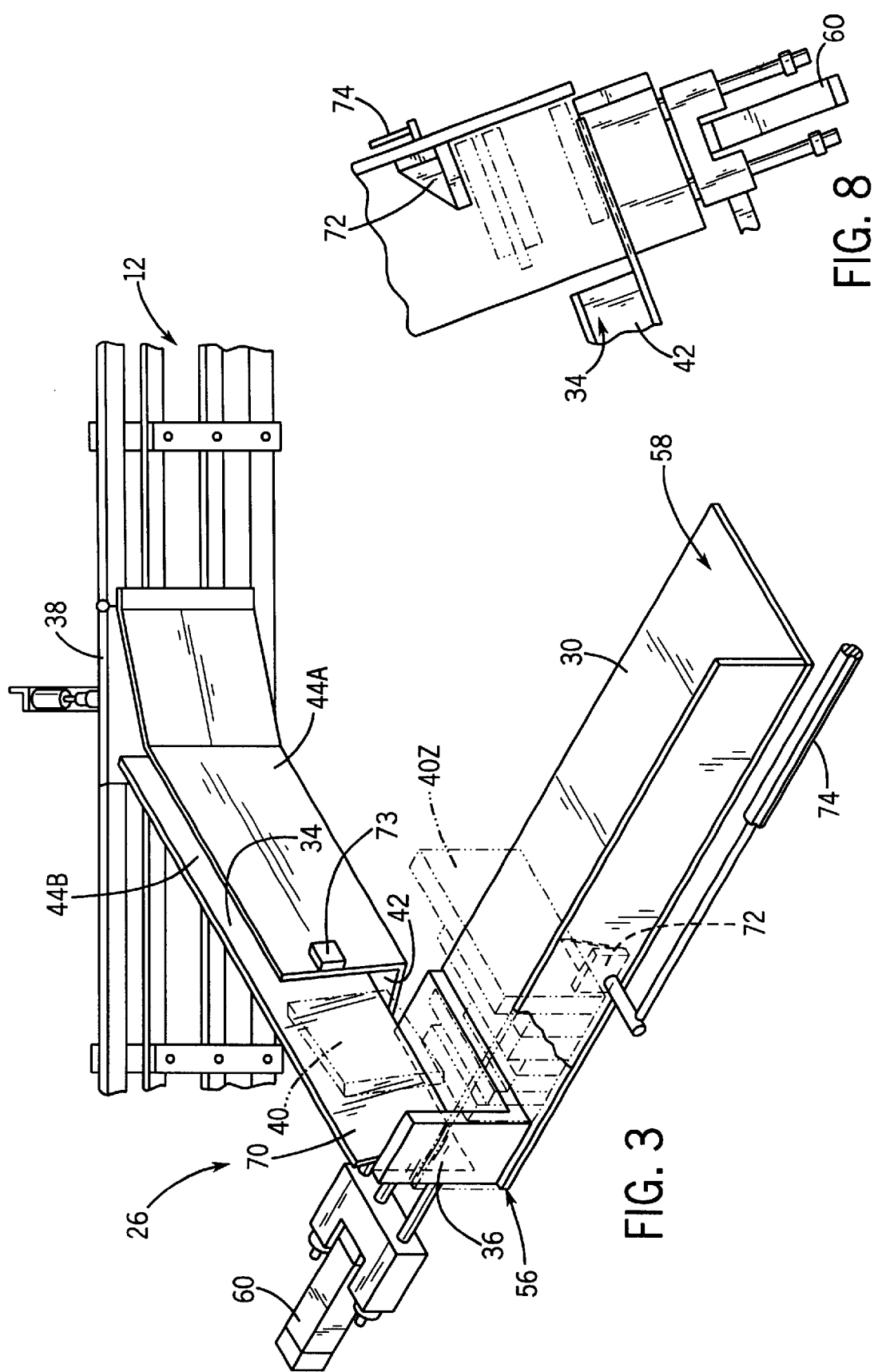

DISCHARGE STACKING STATION FOR SORTATION CONVEYING SYSTEM

FIELD OF THE INVENTION

This invention relates to sortation conveying systems used to fulfill orders of intermingled articles such as assortments of books, video cassette containers, packaged software, compact disk containers or the like. More specifically, the invention relates to discharge stacking stations that stack orders of articles onto an accumulation tray from which attending workers remove the articles and pack the orders for distribution.

BACKGROUND OF THE INVENTION

In large distribution applications, sortation conveying systems are often used to fulfill orders of intermingled articles such as assortments of books, video cassette containers, packaged software, compact disk containers, etc. Workers load articles into the system and the articles are conveyed in single file on a core conveyor belt for the sortation conveying system. As the assorted articles move along the core conveyor belt in single file, the system reads bar code information on each respective article. Based on this information, a programmable computer instructs the system with respect to further downstream processing and assorting of articles into various outgoing orders. The downstream end of the sortation conveying system normally includes a system of computer controlled diverting gates that divert articles into appropriate discharge stacking stations for outgoing orders. Outgoing orders typically contain 100 or more articles. Workers take the articles from the respective stacking station, and pack the orders for distribution. If an article is loaded onto the core conveyor and is not needed for any of the outgoing orders, it is diverted into a leftover bin. These types of sortation conveying systems are particularly effective in large distribution applications because order fulfillment and sortation are electronically integrated, thus substantially reducing the likelihood of human error in fulfilling the orders.

It is important to note that stacking the sorted articles minimizes damage to the articles being handled. For example, diverting articles into bins creates substantially more damage than stacking the orders.

The present invention was developed by the assignee of this application in order to foster more efficient mechanical handling of articles in the discharge stacking stations. In particular, it was desirable to develop a stacking station that was able to efficiently handle and move articles with the articles standing upright on edge, and without allowing the articles to tip. Importantly, it is desirable that this be done at speeds sufficiently high so that the operation of the stacking stations does not create an efficiency bottleneck for the overall system. In addition, it is desirable that the stacking stations dispense orders in a manner that is convenient and accessible for workers to unload.

SUMMARY OF THE INVENTION

The invention is a discharge stacking station that automatically stacks selected articles sequentially onto a substantially horizontal accumulation tray such that the articles are standing upright on edge and in series side-by-side, thus rendering the unloading of the articles from the accumulation tray convenient and efficient. The accumulation tray preferably includes an inclined bottom wall (e.g. downward inclination of 15°–30°), and a back wall extending perpendicularly upward. The accumulation tray is disposed substantially horizontally between a loading end of the tray and an unloading end of the tray.

The invention involves the use of a reciprocating stacking member located at the loading end of the accumulation tray. The reciprocating stacking member has a floor that is disposed to move above a small portion of the accumulation tray located at the loading end of the tray. The reciprocating stacking member also preferably has a backstop wall that extends upward perpendicularly from the floor. It is preferred that the reciprocating stacking member effectively nest next to the bottom wall and the back wall of the accumulation tray such that the floor of the reciprocating stacking member slides adjacent a portion of the bottom wall of the accumulation tray and the backstop wall of the reciprocating stacking member slides adjacent a corresponding portion of the back wall of the accumulation tray. A stationary stop member is located generally above the floor of the reciprocating stacking member and is disposed generally perpendicular to the accumulation tray. A chute transfers selected articles from the core conveyor in singular fashion onto the reciprocating stacking member when the reciprocating stacking member is positioned in an article receiving position. Preferably, a photoelectric sensor senses the passing of articles from the chute onto the reciprocating stacking member. After the article is transferred onto the reciprocating stacking member, the reciprocating stacking member is retracted. As the reciprocating stacking member moves towards the stationary stop wall to the retracted position, the stationary stop wall pushes the article from the floor of the reciprocating stacking member, and the article drops on edge onto the accumulation tray. The reciprocating stacking member then returns to the article receiving position, and in doing so, the reciprocating stacking member incrementally pushes the articles previously stacked on the accumulation tray towards the unloading end of the tray. This process is repeated for each article selected to be stacked onto the tray until the order is filled, or alternatively, the accumulation tray becomes full.

As mentioned, it is preferred that the reciprocating stacking member include a floor as well as a backstop wall extending perpendicularly upward from the floor. It is desirable that the wall thickness for both the floor and the backstop wall be in the range between ¾ of an inch to 1 and ½ of an inch. It has been found that this configuration effectively prevents back-tipping of the stacked articles. It is also preferred that the discharge stacking station include a dead plate for preventing tipping of the first stacked articles on the accumulation tray. Preferably, the dead plate is connected to a linear motion actuator, such as an automatically controlled pneumatic cylinder, that is able to drive the dead plate along the length of the accumulation tray between a home position located near the reciprocating stacking member and a full range position located near the unloading end of the tray. Before the first article is stacked on the accumulation tray, the dead plate is positioned near the loading end of the accumulation tray by the reciprocating stacking member. Then the pneumatic cylinder is deactivated (i.e., the dead plate is connected to a dead cylinder). As the articles are stacked on the accumulation tray, the dead plate abuts the first stacked article to prevent front tipping of the article in the accumulation tray. As additional articles are stacked on the accumulation tray, the dead plate moves incrementally along the accumulation tray. It has been found that the use of dead cylinder provides the dead plate with sufficient resistance to prevent tipping of the articles in the accumulation tray during the stacking procedure, yet does not interfere with the stacking of the articles onto the accumulation tray. When the order is complete or the accumulation tray is full, the attending worker unloads the articles from the accumulation tray. After the articles have been unstacked, the linear actuator (i.e. the pneumatic cylinder) automatically returns the dead plate to the home position ready to accept the next order being stacked on the accumulation tray. In many applications, it may be desirable toreplace the dead plate with a combined pushing mechanism and dead plate as disclosed incopending patent application Ser. No 09/439,863, filed on Nov. 12, 1999 entitled. "Combined Pushing Mechanism and Dead plate" assigned to the assignee of the present application, incorporated herein by reference.

Various other features and objects of the invention may be apparent to those skilled in the art upon inspecting the drawings and the following description thereof.

BRIEF DESCRIPTION OF THE DRAWINGS

FIG. 1 is a schematic top view of a sortation conveying system which includes discharge stacking stations in accordance with the invention.

FIG. 2 is a top view of some discharge stacking stations configured in accordance with the invention.

FIG. 3 is a perspective view of a discharge stacking station constructed in accordance with the preferred embodiment of the invention.

FIG. 4 is a detailed top view of a portion of a discharge stacking station constructed in accordance with the invention.

FIG. 8 is a top view of a portion of the discharge stacking station taken along line 8—8 in FIG. 7.

DETAILED DESCRIPTION OF THE INVENTION

Figure 5:
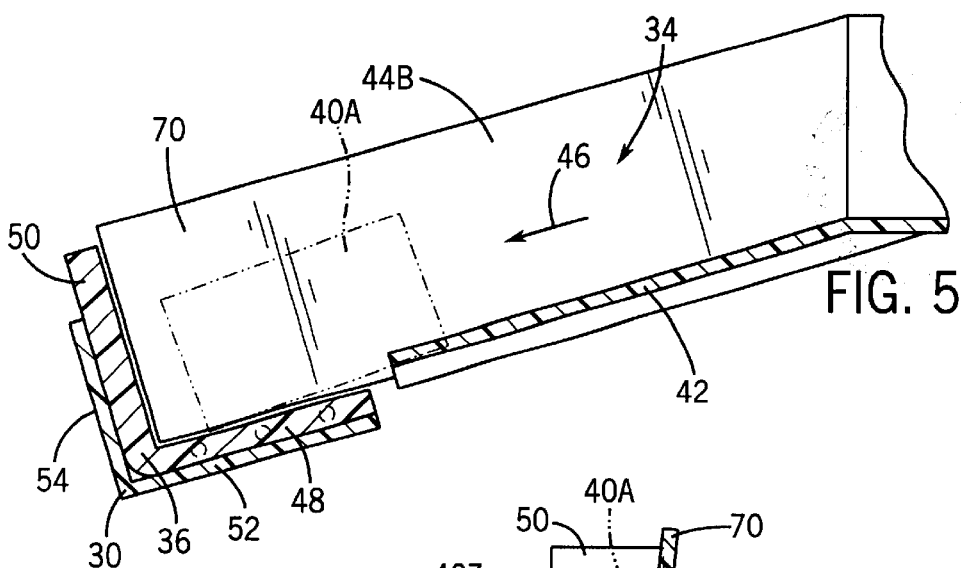
FIG. 5 is a view taken along line 5—5 in FIG. 4.

FIG. 1 illustrates a sortation conveying system 10 that is capable of fulfilling orders of intermingled articles having assorted sizes, such as assorted books, intermingled with video cassette containers, compact disc containers, packaged software, or the like. The sortation conveying system 10 includes a core conveyor belt 12 that extends for essentially the entire length of the sortation conveying system, e.g. approximately 300 feet. The core conveyor belt 12 is divided into pockets of equal length (not shown). Each pocket is separated by a cleat on the conveyor belt 12. The core conveyor 12 operates at a relatively high rate of speed, for example, approximately 250 parts per minute can be processed and sorted by the system.

Referring still to FIG. 1, the sortation conveying system 10 includes a plurality of inductor stations 18 which are used to load articles onto the core conveyor belt 12. Each of the articles is stacked onto the core conveyor belt standing upright on edge and into an assigned pocket on the core conveyor belt 12. The core conveyor belt 12 then conveys articles in single file for downstream processing and sorting.

The core conveyor belt 12 is preferably a continuous motion conveyor belt. The system 10 includes a bar code scanning station 20, and a series of label printing and application stations 22. At the downstream end of the system 10, articles pass through a guide assembly 24 that includes a series of diverting gates and doors that are selectively operated to divert articles passing along on the core conveyor belt 12 into one of several discharge stacking stations 26. FIG. 1 shows ten stacking stations 26 each allocated to a specific outgoing order of sorted articles. A computer control system programs the guide assembly 24 to sort the articles traveling down the core conveyor 12 into the appropriate stacking station 26 to fulfill the assigned order. Orders typically contain up to or more than 100 assorted articles. If an article is not required to be diverted in from one of the several stacking stations 26, the article is discharged into a leftover bin 28 from which the articles can be reprocessed at a later time.

FIG. 2 shows three discharge stacking stations 26a, 26b, 26c that are disposed to stack selected articles sequentially on an associated accumulation tray 30a, 30b, 30c. The articles are conveyed on conveying belt 12 in the direction of arrow 32. Articles are conveyed on the core conveyor 12 standing upright on edge and in single file. Each discharge stacking station includes a chute 34a, 34b, 34c that transports articles from the core conveyor belt 12 to a reciprocating stacking member 36a, 36b, 36c in order to stack the selected article onto the respective accumulation tray 30a, 30b, 30c. Pneumatically controlled diverting gates 38a, 38b, 38c are controlled by the system computer to divert selected articles into the appropriate chute 34a, 34b, 34c. In FIG. 2, diverting gates 38a and 38b remain in an open position, thus allowing articles to pass on the conveyor belt 12 to station 26c where the diverting gate 38c has been extended to divert the respective article 40 into the chute 34c for stacking station 26c.

FIGS. 3 through 5 show one of the discharge stacking stations 26 in more detail. In FIG. 4, the diverting gate 38 has been actuated to divert articles 40a, 40b into the chute 34. The chute 34 is defined by an inclined bottom wall 42 (e.g. 15°–30°) as well as guide walls 44a, 44b. The guide walls 44a, 44b extend generally upward from the inclined bottom wall 42. The width of the chute 34 should be sufficient to accommodate the widest articles sorted by the system. In addition, the angle of inclination of the bottom wall 42 as well as the material of the chute 34 should be selected so that the force of gravity along with the momentum of each article 40 is sufficient to transfer the articles 40 from the core conveyor belt 12 to the reciprocating stacking member 36. FIG. 5 shows article 40a sliding from the bottom wall 42 of the chute 34 in the direction of arrow 46 onto the reciprocating stacking member 36. The reciprocating stacking member 36 includes a floor 48 and a backstop wall 50 that extends perpendicularly upward from the rear edge of the floor 48. As shown best in FIG. 4, the width of the floor 48 and the backstop wall 50 is preferably the same or greater than the width of the chute 34 between the guide walls 44a, 44b. In this manner, the floor 48 of the reciprocating stacking member 36 can fully support articles stacked from the chute 34 onto the reciprocating stacking member 36.

The accumulation tray 30 is preferably elongated, and preferably includes a bottom wall 52 and a back wall 54. The bottom wall 52 is preferably tilted as shown in FIG. 5, and the back wall 54 preferably extends perpendicularly upward from the rear edge of the tilted bottom wall 52. The elongated accumulation tray 30 has a loading end 56 and an unloading end 58, and it is disposed substantially horizontally between the loading end 56 and the unloading end 58. The length of the elongated accumulation tray 30 is a matter of choice, but in the preferred embodiment it is approximately four feet long. The reciprocating stacking member 36 is mounted at the loading end 56, FIG. 3, of the elongated accumulation tray 30. The floor 48 of the reciprocating stacking member 36 slides adjacent the portion of the bottom wall 52 of the accumulation tray 30 near the loading end 56 of the tray, and the backstop wall 50 of the reciprocating stacking member 36 slides adjacent a corresponding portion of the back wall 54 of the accumulation tray 30.

Figure 6:
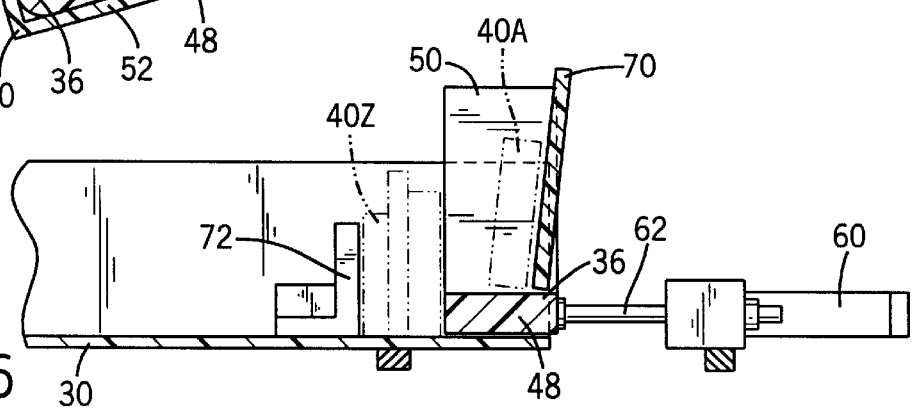
FIG. 6 is a view taken along line 6—6 in FIG. 4 which shows a step in the process of stacking articles onto an accumulation tray in accordance with the invention.
Figure 7:
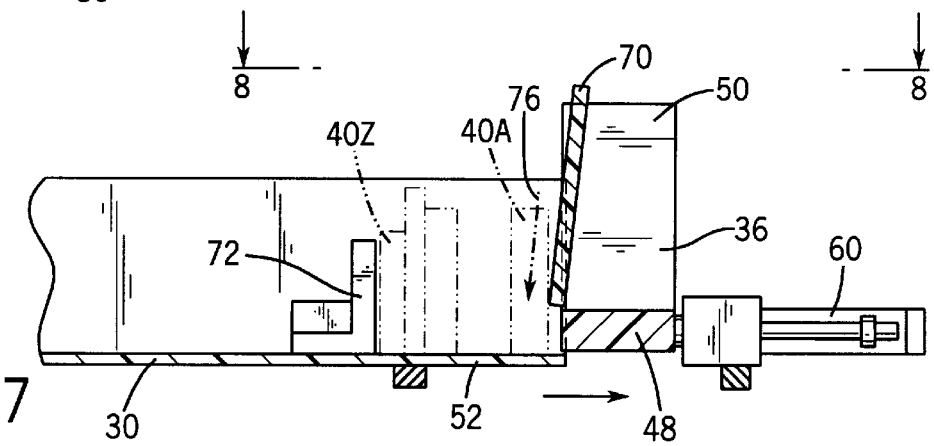
FIG. 7 is a view similar to FIG. 6 showing a subsequent step in the stacking process.

The reciprocating stacking member 36 is moved by a computer controlled actuator 60 which has an arm 62 that is attached to the reciprocating stacking member 36. The actuator 60 is mounted to an actuator mount 64 that is affixed to a frame for the station 26 via bracket 66. Guide rails 68 are also connected to the reciprocating stacking member 36 and extend parallel with the arm 62 for the actuator 60. The actuator mount 64 includes openings that slidably receive the guide rails 68. The purpose of the actuator 60 is to move the reciprocating stacking member 36 between an article receiving position (FIGS. 3, 4, 6 and 9) and a retracted position (FIGS. 7 and 8).

It is important to note the guide wall 44b of the chute extends beyond the floor 42 of the chute 34 and above the floor 48 of the reciprocating stacking member 36. In the drawings, this extended portion of the chute guide wall 44b is designated by reference numeral 70 and is referred to in this discussion as a stationary stop member. The stationary stop member 70 is not only disposed generally above the floor 48 of the reciprocating stacking member 36, but also disposed generally perpendicular (preferably approximately 10°–15°) to the elongated accumulation tray 30 such that the side of the stationary stop member generally faces towards the unloading end 58 of the tray 30. While it is preferred that the stationary stop member 70 take the form of a wall extension, the stationary stop member 70 may take other forms such as stationary fingers or the like.

A dead plate 72 is provided for movement along the length of the elongated accumulation tray 30. The dead plate 72 is preferably driven by a linear motion actuator, for example, an automatically controlled pneumatic cylinder 74. The purpose of the dead plate 72 is to prevent the endmost item 40z, FIG. 3, stacked on the accumulation tray 30 from tipping. As mentioned previously, it may be desirable to replace the dead plate 72 with a combined pushing mechanism and dead plate as disclosed in the above-incorporated copending patent application Ser. No. 09/439,863.

Figure 9:
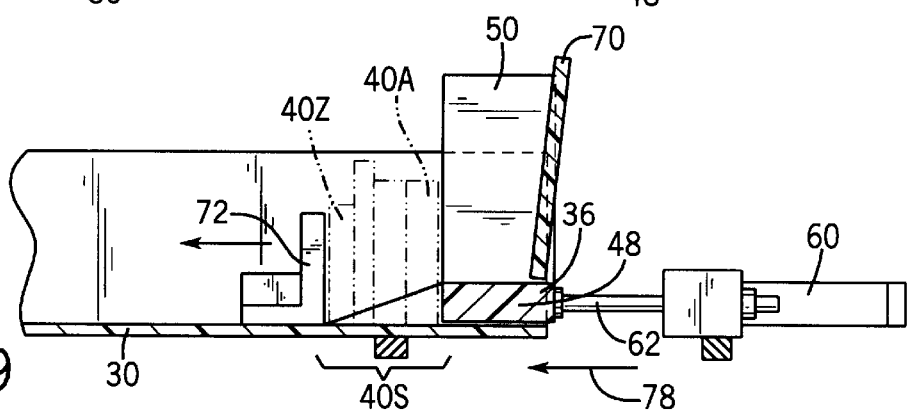
FIG. 9 is a view similar to FIGS. 6 and 7 showing another step in the process of stacking articles on the accumulation tray.

The operation of the discharge stacking station 26 is now discussed with reference to FIGS. 5–9. FIGS. 5 and 6 show article 40a being stacked on the reciprocating stacking member 36. In FIGS. 5 and 6, the reciprocating stacking member is positioned in an article receiving position. In other words, the arm 62 for actuator 60 is extended so that article 40 is stacked onto the floor 48 of the reciprocating stacking member 36 as it is transferred from the inclined chute 34. Referring to FIG. 3, the station 26 includes a photoelectric eye 73 that is positioned to sense the passing of articles through the chute 34 onto the reciprocating stacking member 36. Preferably, the photoelectric eye is mounted on guide wall 44a for the chute 34. After the photoelectric sensor 73 senses the passing of an article onto the reciprocating stacking member 36, the system computer instructs the actuator 60 to move the reciprocating stacking member 36 towards the stationary stop member 70 and to the retracted position (see FIG. 7) As the reciprocating stacking member 36 is pulled towards the stationary stop member 70, the stationary stop member 70 pushes the article 40a from the floor 48 of the reciprocating stacking member 36, thus causing the article 40a to fall on edge onto the bottom wall 52 of the accumulation tray 30, as depicted by arrow 76 in FIG. 7. The arm 62 of actuator 60 then returns the reciprocating stacking member 36 to the article receiving position as shown in FIG. 9. As the article 40a drops onto the accumulation tray 30, the article 40a slides along the tilted surface of the bottom wall 52 of the accumulation tray such that it aligns with the back wall 54 of the accumulation tray.

As the reciprocating stacking member 36 returns to the article receiving position as depicted by arrow 78 in FIG. 9, the reciprocating stacking member 36 including the floor 48 and the backstop wall 50 push the dropped article 40a along the accumulation tray 30 in the direction of the unloading end 58 of the tray. In doing so, the reciprocating stacking member 36 places the dropped article 40a in a side-by-side series arrangement with previously stacked articles on the accumulation tray 30, and the entire series of articles 40s is incrementally moved along the accumulation tray 30 towards the unloading end 58 of the accumulation tray. This process is repeated for each respective article that is selected to be stacked on the elongated accumulation tray 30, and continues until the order is filled, or alternatively, the accumulation tray 30 needs to be emptied.

It is desirable that steps be taken to reduce the likelihood that articles tip when being stacked on the accumulation tray 30. To this end, it is desirable that the reciprocating stacking member 36 include the back wall 50. The existence of a back wall 50 will help prevent the dropped article 40a from back-tipping when the reciprocating stacking member 36 moves the dropped article 40a along the accumulation tray 30 towards the side-by-side series of articles 40s. In addition, it is desired that the wall thickness of the floor 48 and the back wall 50 of the reciprocating stacking member 36 be significant in order to reduce the chance of back-tipping, for example, a wall thickness in the range between ¾ of an inch to 1 and ½ of an inch has been found preferable in implementing the invention.

As mentioned, it is also desirable to use the dead plate 72 to prevent the first stacked article 40z from tipping forward. Before any of the articles are stacked on the accumulation tray 30, the pneumatic cylinder 74 positions the dead plate at a home position located near the loading end 56 of the accumulation tray 30 adjacent the reciprocating stacking member 36. Preferably, the pneumatic cylinder 74 which drives the dead plate 72 is deactivated (i.e. dead cylinder) when the articles are being stacked onto the tray 30. When the first stacked article 40z is stacked onto the accumulation tray 30, the article 40z pushes against the dead plate 72 to incrementally move the dead plate 72. The cylinder remains dead until the order is filled. The pneumatic cylinder is then activated to drive the dead plate 72 along the elongated accumulation tray 30 to the home position after the articles have been unstacked from the tray, ready for the next order of articles. Again, as mentioned above, it may be desirable to replace dead plate 72 with a combined pushing mechanism and dead plate as disclosed in the above-incorporated copending patent application Ser. No. 09/439,863.

It should be apparent to those skilled in the art that the invention has been described in the context of its preferred embodiment, and the invention is not intended to be limited thereto. Various alternatives and other embodiments are contemplated as being within the scope of the invention and therefore reference should be made to the following claims which particularly point out and distinctly claim the subject matter regarded as the invention.

We claim:

1. In a sortation conveying system that conveys articles in single file, a method of stacking selected articles sequentially on an accumulation tray comprising the steps of:
   a) providing a reciprocating stacking member at a loading end of the accumulation tray, the reciprocating stacking member having a floor which is mounted to slide adjacent a bottom wall of the accumulation tray between an article receiving position and a retracted position;
   b) providing a stationary stop member located generally above the floor of the reciprocating stacking member and disposed such that a pushing side of the stationary stop member generally faces toward an unloading end of the accumulation tray;
   c) positioning the reciprocating stacking member in the article receiving position;
   d) transferring a single selected article from the conveying system onto the reciprocating stacking member when the reciprocating stacking member is positioned in the article receiving position;
   e) moving the reciprocating stacking member to the retracted position after the respective article has been stacked onto the reciprocating stacking member thereby causing the article to drop from the reciprocating stacking member onto the bottom wall of the accumulation tray;
   f) returning the reciprocating stacking member to the article receiving position thereby pushing the dropped article in the accumulation tray towards the unloading end of the tray; and
   g) repeating steps d) through f) for each respective article that is selected to be stacked on the accumulation tray.

2. A method as recited in claim 1 further comprising the step of:
   stabilizing the first stacked article on the accumulation tray from through the use of a dead plate that is connected to a linear motion pneumatic cylinder, the pneumatic cylinder being deactivated when articles are being stacked on the accumulation tray.

3. A method as recited in claim 1 wherein the reciprocating stacking member further comprises a backstop wall extending upward from the floor of the reciprocating stacking member, wherein the backstop wall of the reciprocating stacking member is oriented so as to slide adjacent the back wall of the accumulation tray.

4. A method as recited in claim 3 further comprising the step of:
   sensing the passing of an article onto the reciprocating stacking member when it is positioned in the article receiving position before moving the reciprocating stacking member to the retracted position in accordance with step e).

* * * * *

UNITED STATES PATENT AND TRADEMARK OFFICE
CERTIFICATE OF CORRECTION

PATENT NO. : 6,296,437 B1
DATED : October 2, 2001
INVENTOR(S) : David A. Remsing, Jason M. Knas, Todd R. Eggebrecht It is certified that error appears in the above-identified patent and that said Letters Patent is hereby corrected as shown below:

<u>Column 8, claim 2,</u>
Line 10, after "tray" delete "from".

Signed and Sealed this

Twelfth Day of March, 2002

Attest:

*Attesting Officer*

JAMES E. ROGAN
*Director of the United States Patent and Trademark Office*